United States Patent
Schmuecking

(10) Patent No.: US 11,689,416 B2
(45) Date of Patent: Jun. 27, 2023

(54) HARDWARE DEVICE ONBOARDING

(71) Applicant: Telefonaktiebolaget LM Ericsson (publ), Stockholm (SE)

(72) Inventor: Georg Schmuecking, Aachen (DE)

(73) Assignee: Telefonaktiebolaget LM Ericsson (Publ), Stockholm (SE)

(*) Notice: Subject to any disclaimer, the term of this patent is extended or adjusted under 35 U.S.C. 154(b) by 0 days.

(21) Appl. No.: 17/632,049

(22) PCT Filed: Jun. 22, 2020

(86) PCT No.: PCT/EP2020/067364
§ 371 (c)(1),
(2) Date: Feb. 1, 2022

(87) PCT Pub. No.: WO2021/023427
PCT Pub. Date: Feb. 11, 2021

(65) Prior Publication Data
US 2022/0278894 A1 Sep. 1, 2022

Related U.S. Application Data

(60) Provisional application No. 62/882,778, filed on Aug. 5, 2019.

(51) Int. Cl.
*G06F 15/177* (2006.01)
*H04L 41/0806* (2022.01)
(Continued)

(52) U.S. Cl.
CPC ...... *H04L 41/0806* (2013.01); *H04L 41/0843* (2013.01); *H04L 65/1069* (2013.01);
(Continued)

(58) Field of Classification Search
CPC ............ H04L 41/0806; H04L 41/0843; H04L 67/141; H04L 67/146; H04L 65/1069; H04W 40/36
See application file for complete search history.

(56) References Cited

U.S. PATENT DOCUMENTS

| | | | |
|---|---|---|---|
| 2011/0058560 A1* | 3/2011 | Okita | H04L 41/0806 370/395.53 |
| 2015/0023183 A1* | 1/2015 | Ilsar | H04W 48/08 370/254 |
| 2023/0027233 A1* | 1/2023 | Kumar | H04W 74/0816 |

FOREIGN PATENT DOCUMENTS

| | | | | |
|---|---|---|---|---|
| CN | 20090073316 A | * | 7/2009 | |
| CN | 100574243 C | * | 12/2009 | ............ H04W 28/06 |

(Continued)

OTHER PUBLICATIONS

International Search Report and Written Opinion issued in International Application No. PCT/EP2020/067364 dated Oct. 2, 2020 (16 pages).

*Primary Examiner* — Richard G Keehn
(74) *Attorney, Agent, or Firm* — Rothwell, Figg, Ernst & Manbeck, P.C.

(57) ABSTRACT

A handover node may receive a first hardware device identifier transmitted by a hardware device and a second hardware device identifier transmitted by a manager node. The handover node may determine whether the first and second hardware device identifiers match and, as a result of determining that the first and second hardware device identifiers match, transmit contact information for the manager node to a hardware device. A manager node may receive a hardware device identifier that identifies a hardware device, transmit the hardware device identifier to a handover node, and transmit contact information for the manager node to the handover node. The contact information may include a port
(Continued)

number of the manager node different than a port number used to communicate with the handover node. The manager node may receive a request to establish a communication session between the hardware device and the manager node.

20 Claims, 9 Drawing Sheets

(51) Int. Cl.
*H04L 41/084* (2022.01)
*H04L 67/141* (2022.01)
*H04L 67/146* (2022.01)
*H04L 65/1069* (2022.01)
*H04W 40/36* (2009.01)

(52) U.S. Cl.
CPC .......... *H04L 67/141* (2013.01); *H04L 67/146* (2013.01); *H04W 40/36* (2013.01)

(56) References Cited

FOREIGN PATENT DOCUMENTS

| | | | | |
|---|---|---|---|---|
| JP | 2021526775 A | * | 12/2021 | |
| WO | WO-2012136762 A1 | * | 10/2012 | ........ H04W 36/0011 |
| WO | 2019/147311 A1 | | 8/2019 | |
| WO | WO-2019147311 A1 | * | 8/2019 | ............. G06F 21/57 |

* cited by examiner

HARDWARE DEVICE ONBOARDING

CROSS REFERENCE TO RELATED APPLICATION

This application is a 35 U.S.C. § 371 National Phase Entry Application from PCT/EP2020/067364, filed Jun. 22, 2020, designating the United States, which claims priority to U.S. provisional patent application No. 62/882,778, filed Aug. 5, 2019, the disclosures of which are incorporated herein by reference in their entirety.

TECHNICAL FIELD

This disclosure relates to apparatuses and methods for managing a hardware device.

BACKGROUND

Hardware devices are manufactured and shipped to customers. A hardware device is installed at a customer site and connected to a network (e.g., the Internet). Typically, the hardware device is indirectly connected to the Internet via a firewall. The hardware device then needs to establish a communication session with a manager node so that the manager node can onboard the hardware device. There are two ways to establish the communication session between the manager node and the hardware device.

The first way is to configure the manager node with the necessary information for establishing the communication session with the hardware device. The necessary information may include a domain name or public Internet Protocol (IP) address and a Transmission Control Protocol (TCP) or User Datagram Protocol (UDP) endpoint for the hardware device. Using the information for establishing the communication session with the hardware device, the manager node can contact the hardware device and establish a communication session.

The second way is to configure the hardware device with the necessary information (e.g., domain name or public IP-address and TCP/UDP endpoint for the manager node) for establishing the communication session with the manager node. Using the information for establishing the communication session with the manager node, the hardware device can contact the manager node and establish a communication session.

The configuration of the hardware device typically occurs in one of two ways. The first configuration method is to preconfigure the information into the hardware device during the manufacturing or shipping process as soon as it is clear which customer will receive the hardware device. The second configuration method is to configure the information at the customer site either by a technician or the customer itself.

SUMMARY

Certain challenges presently exist with respect to the known ways of setting up the communication session between the manager node and the hardware device. For example, the first known way (i.e., configuring the manager node with the necessary contact information for establishing the communication session with the hardware device) suffers from a problem related to the customer networks. In order to protect their networks, customers usually use a firewall, which typically only permits outgoing communication session establishment. This means that the manager (even if configured with the necessary information) is not able to connect to the hardware device. Therefore, the first known way will not work in the usual situation where there is a firewall. Instead, when there is a firewall, the hardware device needs to initiate the communication session between hardware device and manager node.

The second known way (i.e., configuring the hardware device with the necessary contact information for establishing the communication session with the manager node) also suffers from problems. First, all hardware devices should not be preconfigured with contact information for the same manager node. This is because individual customers have different latency and data protection requirements, and a single manager node is generally not able to fulfill all requirements for all customers at the same time. Therefore, multiple manager nodes are needed, and which manager node is responsible for a given hardware device depends on the customer using the hardware device. Accordingly, all hardware devices should not be preconfigured to establish a communication session with the same manager node.

Second, hardware devices typically receive their initial configurations and are placed in storage before a customer order is received. The manager node contact information is customer specific, and it is not known which hardware device goes to which customer at the time the hardware device is initially configured. Accordingly, in this scenario, the manager information should not be configured during manufacturing or initial configuration.

Third, the warehousing and shipping company typically does not have access to configure the hardware devices and, therefore, cannot configure the hardware devices with customer-specific manager node contact information when the shipping process is initiated and the hardware device-customer relation is established.

Fourth, some business models and/or some customer requirements forbid a technician from the hardware device manufacturer from being at the customer site. In this case, a technician from the hardware device manufacturer may not be able to configure the manager node contact information at installation time on the customer site.

Aspects of the invention overcome one or more of these problems by providing a handover node to which hardware devices initially establish a communication session. In some embodiments, hardware devices may be preconfigured during initial configuration of the hardware devices with the contact information for the handover node. In some embodiments, the handover node may "handover" a hardware device to a manager node by transmitting to the hardware device contact information for the manager node, which the hardware device can then use to establish a communication session with the manager node.

In some embodiments, after physical installation of a hardware device at the customer site, the hardware device may automatically establish a communication session with the handover node. For example, a hardware device that has not yet been onboarded by a manager node may be configured such that when the hardware device is powered on the hardware device automatically executes a computer program (e.g., a daemon) that attempts to establish a communication session with the handover node. In some embodiments, the handover node may perform one or more checks on the hardware device once the communication session is established. In some embodiments, the one or more checks may include one or more of identifying physical installation errors, identifying software installation errors, and validity checks to make sure no third-party hardware is used and no malicious third-party can intrude into the system. In some embodiments, the handover node may provide one or more updates to the hardware device.

In some embodiments, a manager node may be informed of a hardware device identifier that identifies the hardware device. The manager node may send to the handover node one or more of the hardware device identifier and contact information for the manager node. In some embodiments, the contact information for the manager node may include, for example and without limitation, a domain name or an Internet Protocol (IP) address and port number (e.g., a Transmission Control Protocol (TCP) or User Datagram Protocol (UDP)). In some embodiments, the contact information for the manager node may additionally or alternatively include virtual private network (VPN) contact information for a VPN. The VPN contact information may include: a domain name or a public Internet Protocol (IP) address of a VPN server, a TCP or UDP port number, a VPN certificate, etc. In some embodiments, the handover node may forward the contact information for the manager node to the hardware device (e.g., using the established communication session between the handover node and the hardware device). In some embodiments, the handover node may instruct the hardware device to release the communication session established between the hardware device and the handover node and setup a new communication session with the manager node.

One aspect of the invention may provide a method performed by a handover node. The method may include receiving a first hardware device identifier transmitted by a hardware device. The first hardware device identifier may identify the hardware device. The method may include receiving a second hardware device identifier transmitted by a manager node. The second hardware device identifier may identify the hardware device. The method may include determining that the second hardware device identifier matches the first hardware device identifier. The method may include, as a result of determining that the second hardware device identifier matches the first hardware device identifier, transmitting contact information for the manager node to the hardware device. Another aspect may provide a handover node adapted to perform the method.

Yet another aspect of the invention may provide a method performed by a manager node. The method may include receiving a hardware device identifier that identifies a hardware device. The method may include transmitting the hardware device identifier to a handover node. The method may include transmitting contact information for the manager node to the handover node. The contact information may include a port number of the manager node different than a port number of the manager node used to communicate with the handover node. The method may include receiving a request to establish a communication session between the hardware device and the manager node. The request may been transmitted by the hardware device. Another aspect may provide a manager node adapted to perform the method.

Aspects of the invention may provide one or more of the following benefits. With respect to commercial benefits, the invention may provide the benefit of ease of installation of the hardware device for the customer. In some embodiments, the customer may not need to have technical knowledge for configuring the handover node with the correct contact information for a manager node. In some embodiments, this may reduce the amount of training needed for the customer and/or may reduce the amount of errors during installation. Also, the customer may be able to choose its own time plan for installation of the hardware device and does not need to wait on a technician or a specific time window.

With respect to technical benefits, in some embodiments, the manager node contact information, which the hardware device uses to establish a communication session with the manager node, originates on the manager node. Accordingly, in these embodiments, neither the handover node nor the hardware device needs to be pre-configured with a customer-specific configuration for establishing the communication with the manager node. This makes it possible to introduce or delete managers when needed without changes on the handover node or the hardware device.

Some embodiments may provide the technical benefit of establishing a communication session between the hardware device and a customer-specific manager node without the need for a manual configuration at the customer site (either by a technician or the customer itself). In some embodiments, due to the establishment of a communication session between the hardware device and a customer-specific manager node, customer-specific requirements (e.g., very low latency requirements and/or very strict data protection requirements) may be fulfilled (e.g., the hardware device may establish a communication session with the customer-specific manager node that is in the same geographical region as the hardware device).

Some embodiments may provide a technical benefit with respect to the nature of the handover node, which may function as a so-called demilitarized zone. In some embodiments, the handover node may check the validity of the hardware device before the hardware device gains access to the manager node and may thereby prevent intruders from gaining access to the manager node. In some embodiments, the handover node may additionally or alternatively provide updates of the software on the hardware device (e.g., to increase security or make an older hardware device compatible with a newer manager node).

BRIEF DESCRIPTION OF THE DRAWINGS

The accompanying drawings, which are incorporated herein and form part of the specification, illustrate various embodiments.

DETAILED DESCRIPTION

Figure 1:
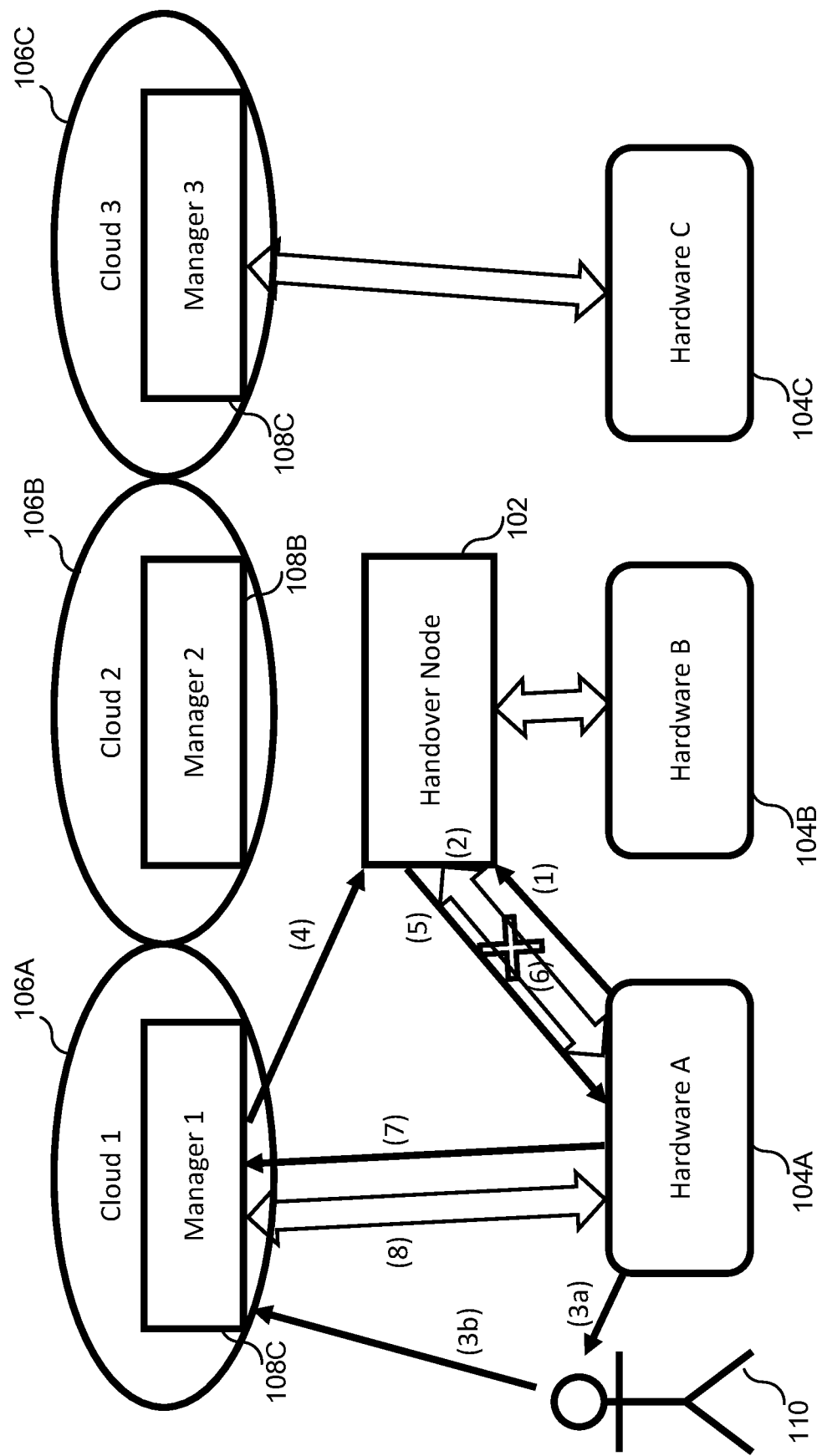
FIG. 1 is a block diagram illustrating a system according to some embodiments.

FIG. 1 is a block diagram of a system including a handover node 102, one or more hardware devices 104 (e.g., hardware devices 104A, 104B, and 104C), and one or more cloud environments 106 (e.g., cloud environments 106A, 106B, and 106C). In some embodiments, one or more of the cloud environments 106 may be customer-specific cloud environments. In some embodiments, the cloud environments 106 may be for different customers. In some embodiments, each of the one or more cloud environments 106 may include a manager node 108 (e.g., manager node 108A, 108B, or 108C) that manages the hardware associated with the cloud environment 106. In some embodiments, the manager nodes 108 may include, for example, any available configuration management tool or self-created tools or scripts. In some embodiments, a manager node 108 consists of one or more computer programs that run on a virtual machine (VM) that runs on a server of a cloud computing environment. Similarly, in one embodiment, handover node 102 consists of one or more computer programs that run on a virtual machine (VM) that runs on a server of a cloud computing environment.

In some embodiments, each of the manager nodes 108 may have the ability to communicate with the handover node 102. In some embodiments, the handover node 102 may assist in the establishment of communication sessions between hardware devices 104 and respective manager nodes 108. In some embodiments, the handover node 102 may include, for example, any available configuration management tool or self-created tools or scripts. In some embodiments, the handover node 102 may enable automatic onboarding of a hardware device 104 (e.g., hardware device 104A) into a customer-specific cloud environment 106 (e.g., cloud environment 106A). In some embodiments, the automatic onboarding may occur without the need for any manual configuration of the hardware device 104 specific to the cloud environment 106. For example, the handover node 102 enables a manager node 108 for a specific customer to onboard a hardware device provided to the customer (e.g., the manager node can onboard the hardware device by, for example, authenticating the hardware device, providing necessary configuration parameters to the hardware device, and/or performing other onboarding functions).

In some embodiments, a hardware device 104 may be, for example and without limitation, a server, a router, an access point, a switch, a gateway, etc. In some embodiments, the hardware device 104 may be purchased by a customer and shipped to a customer site. In some embodiments, the hardware device 104 may need to be connected to a manager node 108 of a cloud environment 106 dedicated to the customer so that the manager node 108 can onboard the hardware device (e.g., providing configuration parameters to the hardware device and/or obtaining configuration parameters from the hardware device). For example, as shown in FIG. 1, a hardware device 104A has been shipped to a site of customer 110, and the hardware device 104A needs to be connected to a manager node 108A of a cloud environment 106A dedicated to the customer 110. Also, as shown in FIG. 1, hardware devices 104B and 104C have been delivered to different customers. FIG. 1 shows steps of a handover process to establish a communication session between the hardware device 104A and the manager node 108A. FIG. 1 shows an intermediate point in the performance of the handover process with respect to the hardware device 104B, with the hardware device 104B having establishing a communication session with the handover node 102. FIG. 1 also shows completion of performance of the handover process with respect to the hardware device 104C, with the hardware device 104C having established a communication session with the manager node 108C.

Figure 2A:
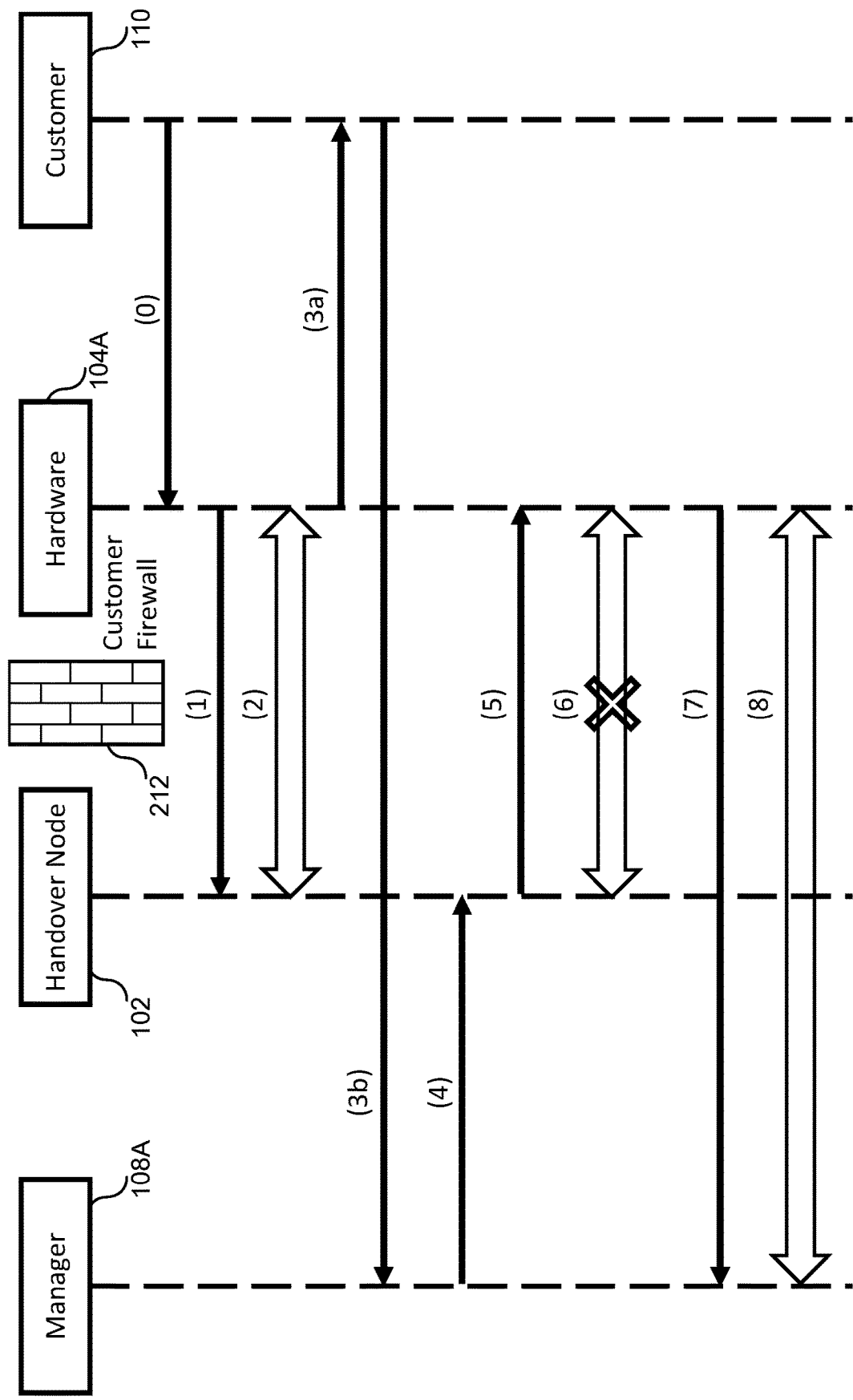
FIGS. 2A and 2B are handshake diagrams illustrating the communications and connections between manager, handover, hardware, and customer nodes according to some embodiments.
Figure 2B:
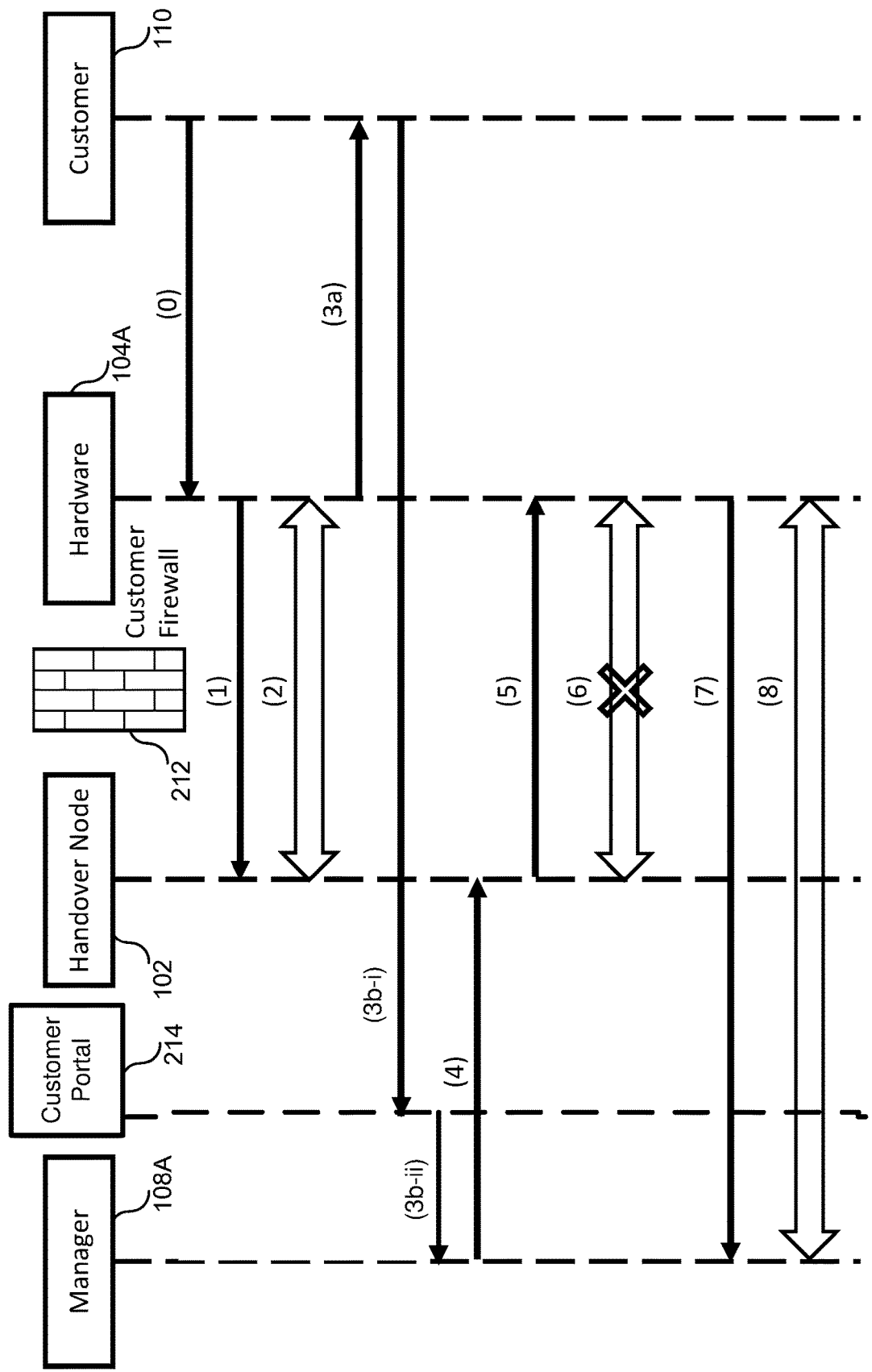
Figure 3:
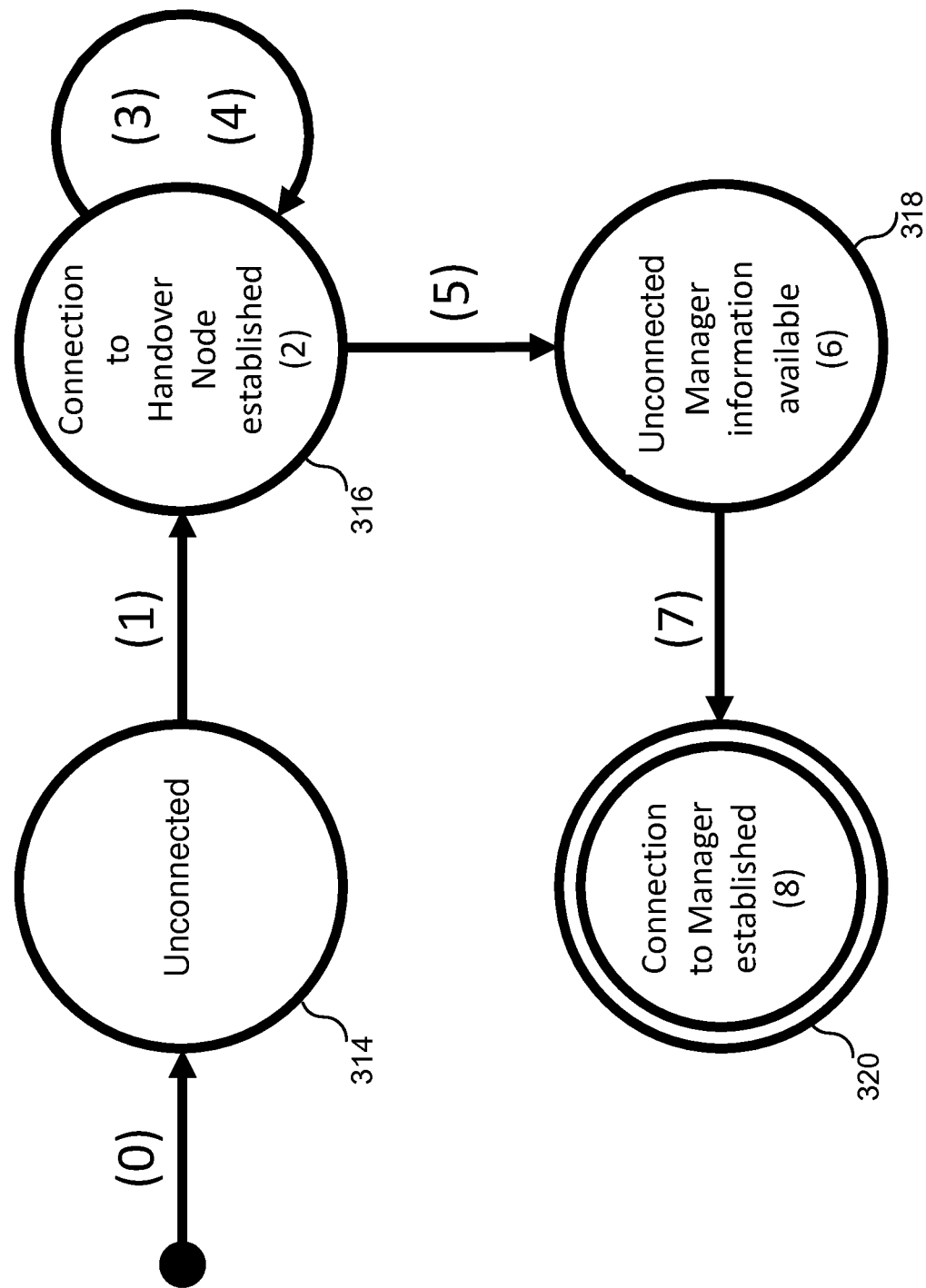
FIG. 3 is a state transition diagram for a hardware device according to some embodiments.

FIGS. 2A, 2B, and 3 are handshake and state transition diagrams illustrating performance of the handover process with respect to the hardware device 104A according to some embodiments. In some embodiments, as shown in FIGS. 2A, 2B, and 3, the customer 110 may perform a step (0) in which the customer installs physically the hardware device 104A and connects the hardware device 104A to the customer's network infrastructure. As shown in FIG. 3, after step (0), the hardware device 104A may be in the in an "unconnected" state 314 in which there is no established communication between the hardware device 104A and any of the handover node 102 and the manager nodes 108.

In some embodiments, as shown by step (1) in FIGS. 1-3, the hardware device 104A may initiate a communication session with the handover node 102. In some embodiments, the hardware device 102 may execute step (1) by transmitting a request (e.g., a TCP connection request) to establish a communication session between the hardware device 104A and the handover node 102, and the handover node 102 may receive the request. In some embodiments, the hardware device 104A may transmit the request automatically (e.g., during boot). In some embodiments, the one or more hardware devices 104 including hardware device 104A may preconfigured with contact information for the handover node 102 (e.g., during an initial configuration of the hardware device 104 during manufacturing). In some embodiments, the hardware device 104A may initiate the communication session with the handover node 102 because customer networks typically use firewalls, such as the firewall 212 illustrated in FIGS. 2A and 2B. The firewalls allow outgoing communication session establishment (e.g., communication sessions initiated by the hardware device 104A) but would not allow incoming communication session establishment (e.g., communication sessions initiated by the handover node 102).

Step (2) of FIGS. 1-3 shows a communication session established between the hardware device 104A and the handover node 102. In some embodiments, the communication session may be established using, for example and without limitation, proprietary protocols (e.g., from the configuration management tools), well-known virtual private network (VPN) protocols, or other well-known protocols (e.g., the Secure Shell (SSH) protocol, the HyperText Transfer Protocol (HTTP), the HyperText Transfer Protocol Secure (HTTPS), the Transmission Control Protocol (TCP), the User Datagram Protocol (UDP), or other protocols). As shown in FIG. 3, when the communication session between the hardware device 104A and the handover node 102 is established in step (2), the hardware device 104A may be in a state 316. In some embodiments, one or more hardware devices 104 in addition to the hardware device 104A may establish a communication session with the handover node 102. For example, as shown in FIG. 1, the hardware device 104B may also establish a communication session with the handover node 102.

In some embodiments, using the communication session between the hardware device 104A and the handover node 102, the handover node 102 may perform one or more checks on the hardware device 104A. In some embodiments, the one or more checks may include identifying whether the hardware device 104A is a valid hardware device (e.g., as opposed to an intruder). In some embodiments, the validity check may be performed using one or more encryption keys. In some embodiments, the hardware device 104A may comprise a trusted platform model (TPM) that stores the one or more encryption keys. In such an embodiment, the hardware device 104A may use a private encryption key to generate a digital signature and then provide the digital signature to the handover node 102 to enable the handover node 102 to use a corresponding public key to confirm that the hardware device 104A has the appropriate private encryption key, thereby authenticating the hardware device 104A. However, it is not necessary that the hardware device 104A include a TPM, and, in some alternative embodiments, the hardware device 104A may not include a TPM.

In some embodiments, the one or more checks may additionally or alternatively include checking the physical and/or software installation of the hardware device 104A. In some embodiments, using the communication session between the hardware device 104A and the handover node 102, the handover node 102 may perform one or more updates of the software of the hardware device 104A. In some embodiments, the handover node 102 act as a gatekeeper between the hardware devices 104 and the one or more manager nodes 108. In some embodiments, the handover node 102 may establish a demilitarized zone, which makes it harder for intruders to gain access to the manager nodes 108.

In some embodiments, as shown in FIGS. 1-3, the customer 110 may perform a step (3a) including reading a hardware device identifier that identifies the hardware device 104A. In some embodiments, the customer 110 may read the hardware device identifier from a printed label on the hardware device 104A and/or the packaging thereof. In some alternative embodiments, the hardware device identifier may be additionally or alternatively readable through software in an operating system on the hardware device 104A.

In some embodiments, as shown in FIGS. 1, 2A, and 3, the customer 110 may perform a step (3b) in which the customer 110 provides the hardware device identifier to the manager node 108A of the cloud environment 106A dedicated to the customer 110. In some embodiments, the customer 110 may transmit the hardware device identifier using a customer node, which may be operated by the customer 110 that managers the hardware device 104A. In some embodiments, the manager node 108A may receive the hardware device identifier.

In some embodiments, as shown in FIG. 2B, a customer portal 214 (e.g., an HTTP portal) may be used in step (3b) to provide the hardware device identifier to the manager node 108A. In these embodiments, as shown in FIG. 2B, step (3b) may include sub-step (3b-i) and sub-step (3b-i). In sub-step (3b-i), the customer 110 may transmit the hardware device identifier using the customer node (e.g., a web browser), and the customer portal 214 may receive the hardware device identifier. For example, prior to step 3b-i, the customer's web browser may receive from the portal 214 one or more web objects (e.g., HTML, document, Javascript script, etc.) that cause the browser to display to the customer a web page that either enables the customer to input the hardware device identifier into the web page or select the hardware device identifier from one or more hardware device identifiers included in the web page and then cause the browser to transmit the input/selected hardware device identifier to the portal 214.

In sub-step (3b-ii), the customer portal 214 may transmit the hardware device identifier, and the manager node 108A may receive the hardware device identifier. In some embodiments, the customer portal 214 may determine to which of the manager nodes 108 the hardware device identifier should be sent based on an identification of the customer 110 that transmitted the hardware device identifier. In some embodiments, the customer 110 may be identified based on information transmitted by the customer node of the customer 110 (e.g., login information for gaining access to the customer portal). In some embodiments, the customer portal 214 may include a lookup table for that associates customer identifications and/or login information with manager nodes.

In some embodiments, as shown by step (4) in FIGS. 1-3, the manager node 108A may transmit the hardware device identifier to the handover node 102, and the handover node 102 may receive the hardware device identifier, which identifies the hardware device 104A. In some embodiments, the transmission of the hardware device identifier by the manager node 108A and the receipt thereof by the handover node 102 may be unseen from the point of view of the hardware device 104A. In some embodiments, in step (4), the manager node 108A may additionally transmit contact information for the manager node 108A, and the handover node 102 may receive the contact information. In some embodiments, the contact information may include, for example, a domain name or an Internet Protocol (IP) address of the manager node 108A and a port number (e.g., a TCP or UDP port) for the hardware device 104A to use in establishing a communication session with the manager node 108A. In some embodiments, the contact information may additionally or alternatively include VPN contact information (i.e., information that enables the hardware device 104A to contact and establish a session with a VPN server). Thus, the VPN contact information may include a domain name or a public Internet Protocol (IP) address of a VPN server, a TCP or UDP port number, a VPN certificate, etc.

In some embodiments, the hardware device 104A may transmit the hardware device identifier that identifies the hardware device 104A, and the handover node 102 may receive the hardware device identifier transmitted by hardware device 104A. In some embodiments, the handover node 102 may receive the hardware device identifier using the communication session between the hardware device 104A and the handover node 102. In some embodiments, handover node 102 may retrieve the hardware device identifier using the established communication session with the hardware device 104A and the operating system of the hardware device 104A.

In some embodiments, the handover node 102 uses the received hardware device identifiers to determine to which of the hardware devices 104 the manager node 108A wants to connect. In some embodiments, the handover node 102 may determine whether the hardware device identifier transmitted by the manager node 108A matches the hardware device identifier transmitted by the hardware device 104A. In some embodiments, as a result of determining that the hardware device identifier matches the first hardware device identifier, the handover node 102 may transmit the contact information for the manager node 108A, which is shown as step (5) in FIGS. 1-3, and the hardware device 104A may receive contact information for the manager node 108A. In some embodiments, in response to receiving the contact information for the manager node 108A, the hardware device 104A may perform a handover. That is, for example, the hardware device 104A disconnects from the handover node 102 and uses the contact information for the manager node to transmit a message (e.g., TCP connection request) to the manager node 108A. In embodiments in which the contact information for the manager node includes VPN contact information, the hardware device 104A transmits the message to the manager node 108A via a VPN server.

In some alternative embodiments, in step (5), the handover node 102 may transmit one more signals in addition to the contact information for the manager node 108A. In these alternative embodiments, the hardware device 104A may receive the one or more signals, and the one or more signals may cause the hardware device 104A to initiate performance of the handover. In some other alternative embodiments, in step (5), the handover node 102 may transmit one more signals commands or scripts (e.g., in a JavaScript Object Notation (JSON) object) in addition to the contact information for the manager node 108A. In these other alternative embodiments, the hardware device 104A may receive and execute the one or more one more commands or scripts, and execution of the one or more received commands or scripts may cause the hardware device 104A to perform the handover.

In some embodiments, as shown in FIGS. 1-3, the handover may include a step (6) in which the hardware device 104A disables (e.g., tear down) the communication session with the handover node 102. In some embodiments, as shown in FIG. 3, disabling the communication session with the handover node 102 may leave the hardware device 104A in a state 318 in which there is no established communication between the hardware device 104A and any of the handover node 102 and the manager nodes 108. However, in state 318, the hardware device 104A has the contact information for the manager node 108A, which the hardware device 104A may use to establish a communication session with the manager node 108A of the cloud environment 106a associated with the customer 110.

In some embodiments, as shown in FIGS. 1-3, the handover may include a step (7) in which the hardware device 104A may initiate a communication session with the manager node 108A. In some embodiments, the hardware device 102 may execute step (7) by transmitting a request to establish a communication session between the hardware device 104A and the manager node 108A, and the manager node 108A may receive the request. In some embodiments, the hardware device 104A may initiate the communication session with the manager node 108A because, as noted above, customer networks typically use firewalls, such as the firewall 12 illustrated in FIGS. 2A and 2B. The firewalls allow outgoing communication session establishment (e.g., communication sessions initiated by the hardware device 104A) but would not allow incoming communication session establishment (e.g., communication sessions initiated by the manager node 108A). Step (8) of FIGS. 1-3 shows a communication session established between the hardware device 104A and the manager node 108A. In some embodiments, the communication session may be established using, for example and without limitation, proprietary protocols (e.g., from the configuration management tools), well-known VPN protocols, or other well-known protocols (e.g., the SSH protocol, the HTTP, the HTTPS, the TCP, the UDP, or other protocols). As shown in FIG. 3, when the communication session between the hardware device 104A and the manager node 108A is established in step (8), the hardware device 104A may be in the in a state 320.

In embodiments where the contact information for the manager node 108A includes VPN contact information, the hardware device 104A may establish the communication session with manager node 108A through a VPN server. In some embodiments, the VPN server may allow communications transmitted by the hardware device 104A inside the cloud environment 106A so that they may reach the manager node 108A. In some embodiments, the hardware device 104A may communicate with the manager node 108A by transmitting one or more IP packets that (i) are addressed to the VPN server and (ii) including in its payload an IP packet that is addressed to the manager node 108A. In some embodiments, the VPN server may receive the IP packets addressed to the VPN server and transmit the IP packets addressed to the manager node 108A. The manager node 108A may receive the IP packets addressed to the manager node 108A, which were transmitted hardware device 104A through the VPN server.

In some embodiments, the handover node 102 may act as a mediator between the different cloud environments 106 and their managers 108, enabling the hardware devices 104 to connect to a preconfigured central node (i.e., the handover node 102). However, through the handover, it is possible to still have dedicated manager nodes 108, which can be placed geographically close to the respective hardware devices 104, and for establishment of a direct or indirect connection between the manager nodes 108 and the hardware devices 104. In some embodiments, the information flow, which may go from a manager node 108 through the handover node 102 to a hardware device 104, may enable the solution to scale easily without the need to reprogram either of the handover node 102 and the hardware devices 104.

Figure 4:
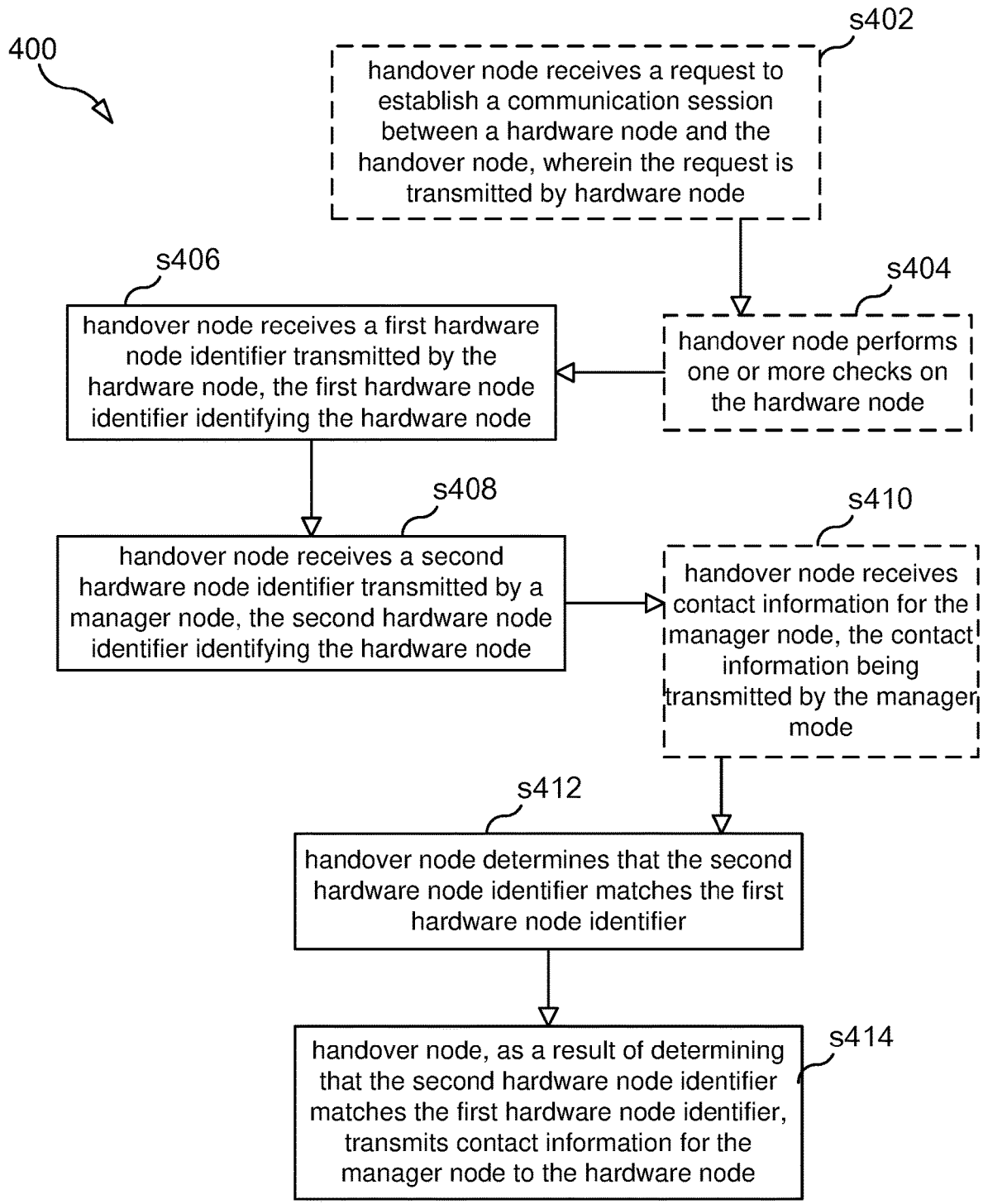
FIG. 4 is a flow chart illustrating a process performed by a handover node according to some embodiments.

FIG. 4 illustrates a process 400 performed by a handover node 102 according to some embodiments. Although the process 400 is illustrated in FIG. 4 for one hardware device 104 and one manager node 108, the process 400 may be performed simultaneously for multiple hardware devices 104 and/or multiple manager nodes 108. In some embodiments, one or more of the steps of the process 400 shown in FIG. 4 with dashed lines may be optional steps.

In some embodiments, the process 400 may optionally include a step s402 in which the handover node 102 receives a request to establish a communication session between a hardware device 104A and the handover node 102. In some embodiments, the request may be transmitted by hardware device 104A.

In some embodiments, the process 400 may optionally include a step s404 in which, after the session is established, the handover node 102 performs one or more checks on the hardware device 104A. In some embodiments, performing the one or more checks on the hardware device 104A may include identifying whether the hardware device 104A is valid. In some embodiments, performing the one or more checks on the hardware device may additionally or alternatively include checking the physical and/or software installation of the hardware device 104A.

In some embodiments, the process 400 may include a step s406 in which the handover node 102 receives a first hardware device identifier transmitted by the hardware device 104A. In some embodiments, the first hardware device identifier identifies the hardware device 104A. In some embodiments, the handover node 102 receives the first hardware device identifier using the communication session between the hardware device 104A and the handover node 102.

In some embodiments, the process 400 may include a step s408 in which the handover node 102 receives a second hardware device identifier transmitted by a manager node 108A. In some embodiments, the second hardware device identifier identifies the hardware device 104A. In some embodiments, the handover node 102 may perform steps s406 and s408 sequentially or simultaneously. In some embodiments, the handover node 102 may perform step s406 before or after step s408.

In some embodiments, the process 400 may optionally include a step s410 in which the handover node 102 receives contact information for the manager node 108A. In some embodiments, the contact information is transmitted by the manager mode 108A. In some embodiments, the handover node 102 may perform steps s408 and s410 sequentially or simultaneously. In some embodiments, the handover node 102 may perform step s408 before or after step s410. In some embodiments, the handover node 102 may receive the second hardware device identifier and the contact information for the manager node 108A in a single message. In some alternative embodiments, the handover node 102 may receive a first message including the second hardware device identifier and a second message including the contact information for the manager node 108A.

In some embodiments, the process 400 may include a step s412 in which the handover node 102 determines that the second hardware device identifier matches the first hardware device identifier. In some embodiments, the process 400 may include a step s414 in which the handover node 102, as a result of determining that the second hardware device identifier matches the first hardware device identifier, transmits contact information for the manager node 108A to the hardware device 104A. In some embodiments, the handover node 102 transmits the contact information using the communication session between the hardware device 104A and the handover node 102.

Figure 5:
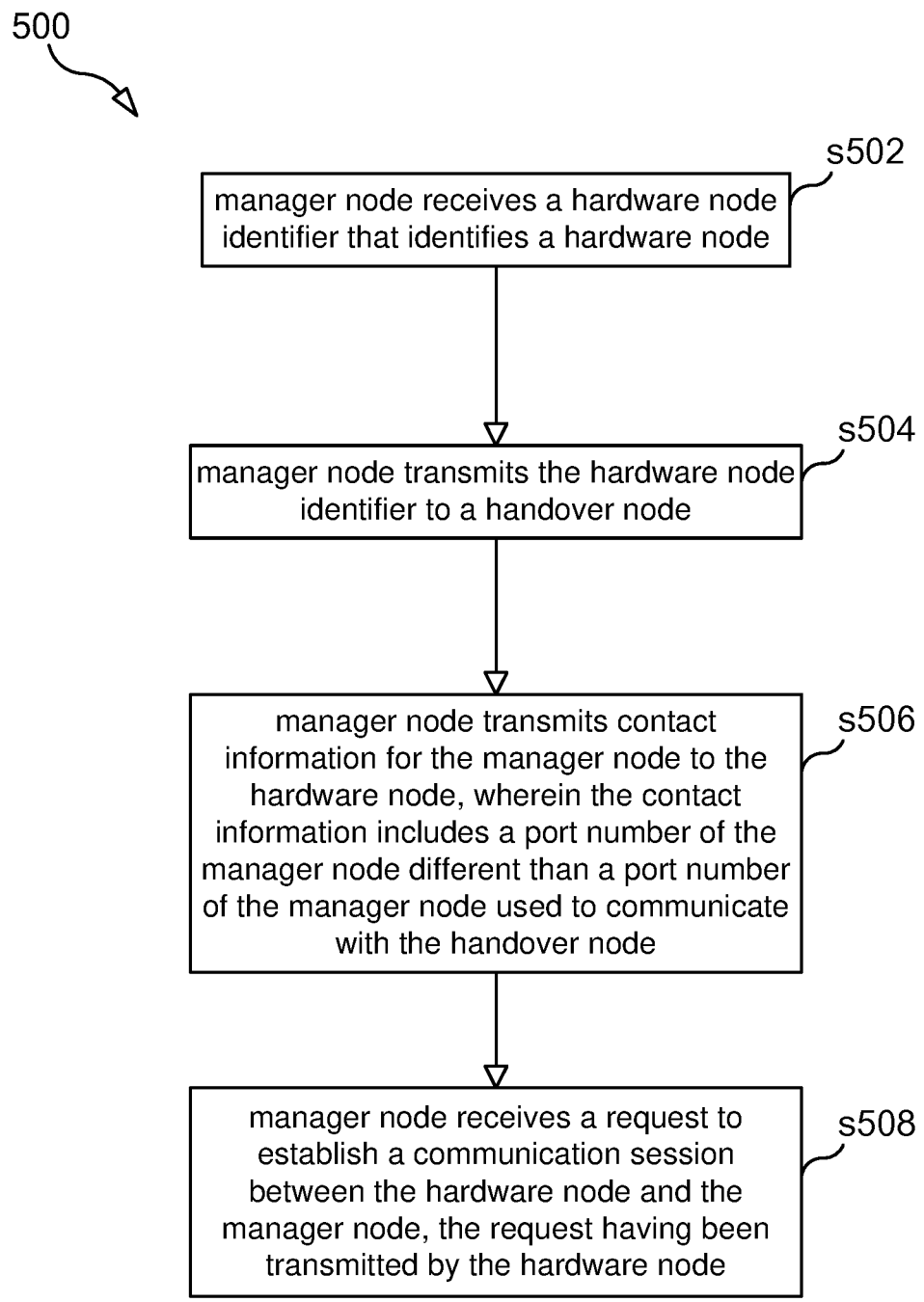
FIG. 5 is a flow chart illustrating a process performed by a manager node according to some embodiments.

FIG. 5 illustrates a process 500 performed by a manager node 104A according to some embodiments. In some embodiments, the process 500 may include a step s502 in which the manager node 108A receives a hardware device identifier that identifies a hardware device 104A. In some embodiments, the received hardware device identifier is transmitted by a node (e.g., a web browser) operated by a customer 110 managing the hardware device 104A.

In some embodiments, the process 500 may include a step s504 in which the manager node 108A transmits the hardware device identifier to a handover node 102.

In some embodiments, the process 500 may include a step s506 in which the manager node 108A transmits contact information for the manager node to the handover node 104A. In some embodiments, the contact information may include a port number of the manager node 108A different than a port number of the manager node 108A used to communicate with the handover node 102. In some embodiments, transmitting the contact information may include transmitting a network layer protocol data unit (PDU) that includes a network layer header and a transport layer PDU. In some embodiments, the transport layer PDU may include a transport layer header and a transport layer payload. In some embodiments, the transport layer payload may include the contact information. In some embodiments, the network layer header may include a domain name or an Internet Protocol (IP) address of the manager node. In some embodiments, the transport layer header may include the port number of the manager node 108A used to communicate with the handover node 102, and the transport layer payload comprises the port number of the manager node 108A that is different than the port number of the manager node 108A used to communicate with the handover node 102.

In some embodiments, the manager node 108A may perform step s504 before, after, or simultaneously with the step s506. In some embodiments, the manager node 108A may transmit the hardware device identifier and the contact information is a single message. In some embodiments, the transport layer payload of a transport layer PDU of a network layer PDU may include (i) hardware device identifier and (ii) the port number of the manager node 108A that is different than the port number of the manager node 108A used to communicate with the handover node 102. In some alternative embodiments, the manager node 108A may transmit the hardware device identifier and the contact information in first and second messages, respectively.

In some embodiments, the process 500 may include a step s508 in which the manager node 108A receives a request to establish a communication session between the hardware device and the manager node. In some embodiments, the request may have been transmitted by the hardware device 104A.

Figure 6:
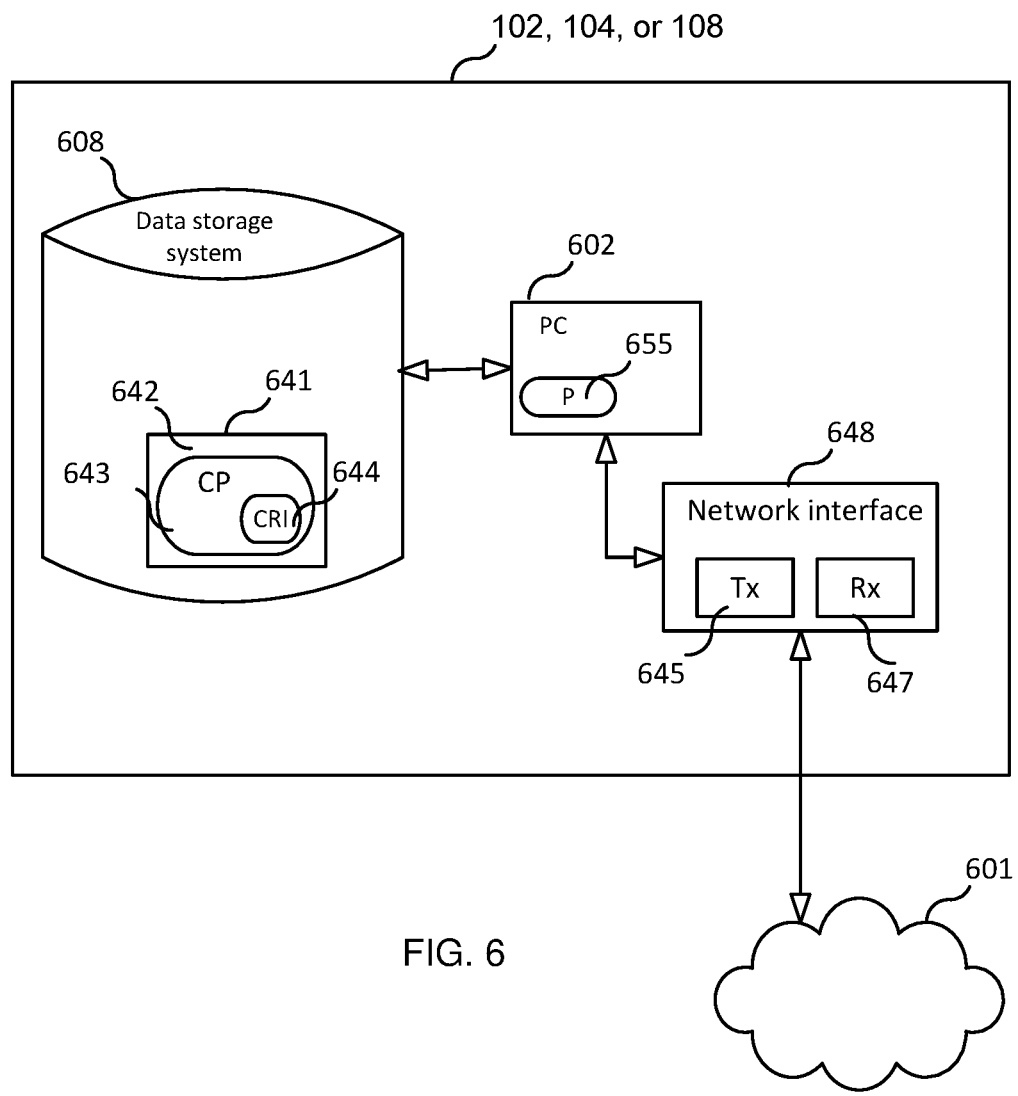
FIG. 6 is a block diagram of a handover, hardware, or manager node according to some embodiments.

FIG. 6 is a block diagram of a handover node 102, a hardware device 104 (e.g., hardware device 104A), or a manager node 108 (e.g., manager node 108A) according to some embodiments. As shown in FIG. 6, one or more of the handover node 102, hardware device 104, and manager node 108 may comprise: processing circuitry (PC) 602, which may include one or more processors (P) 655 (e.g., one or more general purpose microprocessors and/or one or more other processors, such as an application specific integrated circuit (ASIC), field-programmable gate arrays (FPGAs), and the like), which processors may be co-located in a single housing or in a single data center or may be geographically distributed; a network interface 648 comprising a transmitter (Tx) 645 and a receiver (Rx) 647 for enabling the handover node 102, hardware device 104, or manager node 108 to transmit data to and receive data from other nodes connected to a network 601 (e.g., an Internet Protocol (IP) network) to which network interface 648 is connected; and a local storage unit (a.k.a., "data storage system") 608, which may include one or more non-volatile storage devices and/or one or more volatile storage devices. In embodiments where PC 602 includes a programmable processor, a computer program product (CPP) 641 may be provided. CPP 641 includes a computer readable medium (CRM) 642 storing a computer program (CP) 643 comprising computer readable instructions (CRI) 644. CRM 642 may be a non-transitory computer readable medium, such as, magnetic media (e.g., a hard disk), optical media, memory devices (e.g., random access memory, flash memory), and the like. In some embodiments, the CRI 644 of computer program 643 is configured such that when executed by PC 602, the CRI causes handover node 102, hardware device 104, or manager node 108 to perform steps described herein (e.g., steps described herein with reference to the flow charts). In other embodiments, the handover node 102, hardware device 104, or manager node 108 may be configured to perform steps described herein without the need for code. That is, for example, PC 602 may consist merely of one or more ASICs. Hence, the features of the embodiments described herein may be implemented in hardware and/or software.

Figure 7:
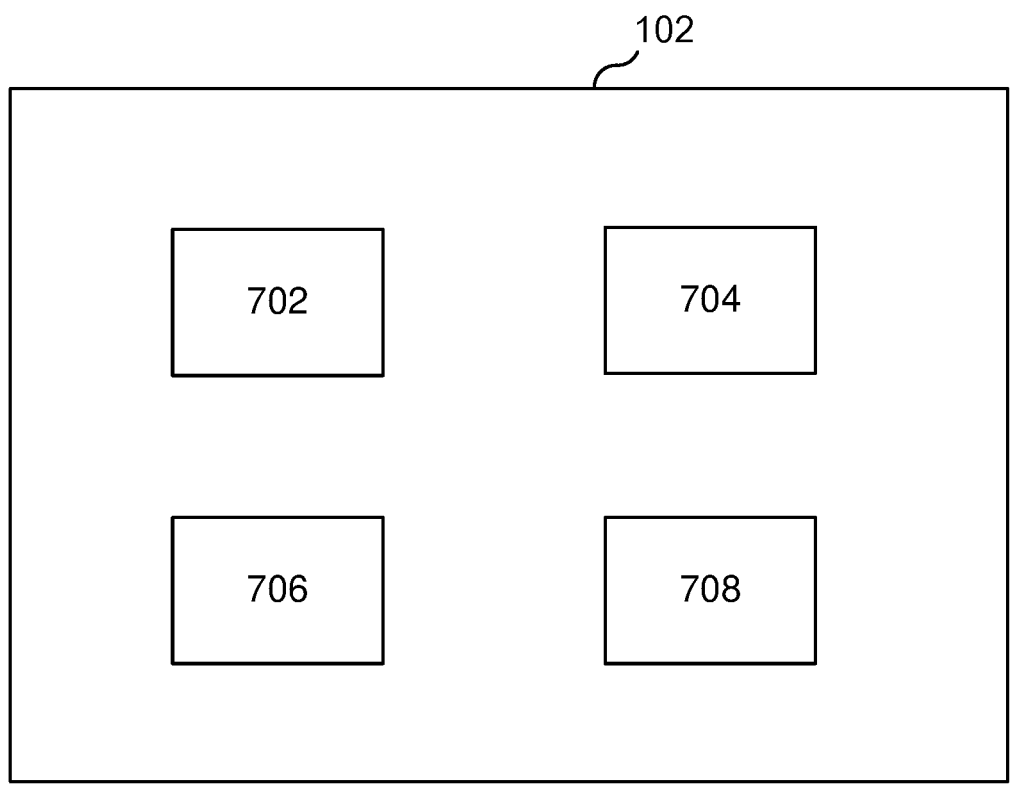
FIG. 7 is a block diagram of a handover node according to some embodiments.

FIG. 7 is a block diagram of a handover node 102 according to some embodiments. As shown in FIG. 7, in some embodiments, the handover node 102 may include a receiving module 702 for receiving a first hardware device identifier transmitted by a hardware device 104A. In some embodiments, the first hardware device identifier may identify the hardware device 104A. In some embodiments, the handover node 102 may include a receiving module 704 for receiving a second hardware device identifier transmitted by a manager node 108A. In some embodiments, the second hardware device identifier identifies the hardware device. In some embodiments, the handover node 102 may include a determining module 706 for determining that the second hardware device identifier matches the first hardware device identifier. In some embodiments, the handover node 102 may include a transmitting module 708 for, as a result of determining that the second hardware device identifier matches the first hardware device identifier, transmitting contact information for the manager node 108A to the hardware device 104A.

Figure 8:
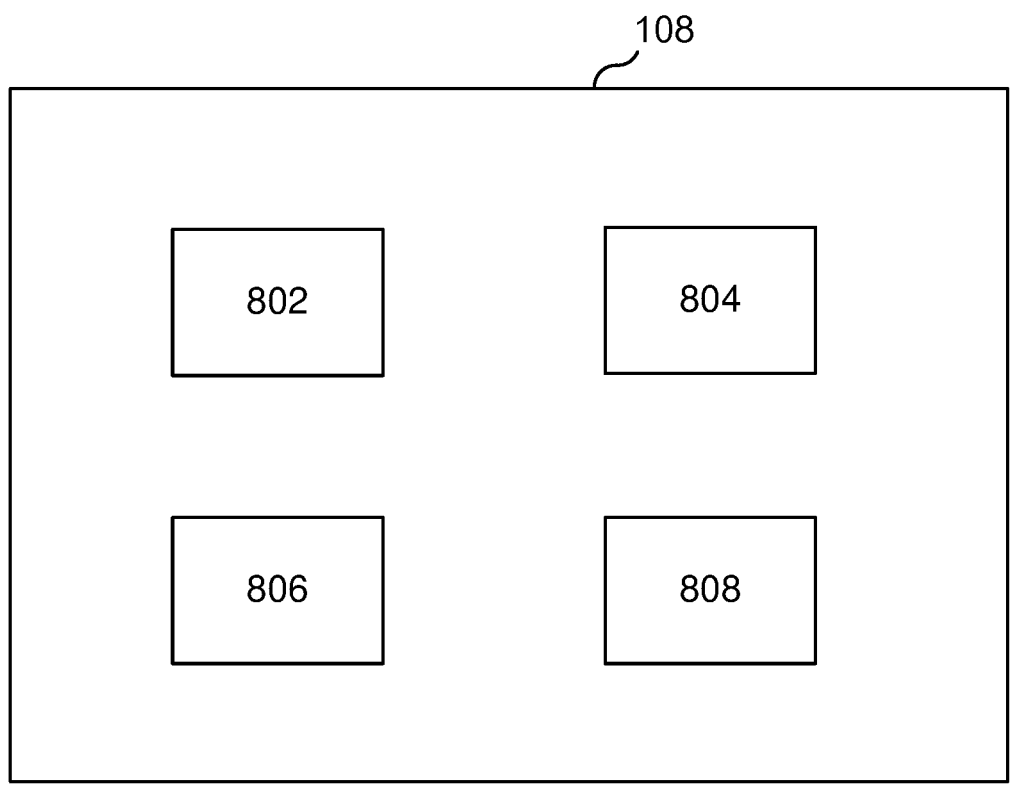
FIG. 8 is a block diagram of a manager node according to some embodiments.

FIG. 8 is a block diagram of manager node 108 according to some embodiments. As shown in FIG. 8, in some embodiments, the manager node 108 may include a receiving module 802 for receiving a hardware device identifier that identifies a hardware device 104. In some embodiments, the manager node 108 may include a transmitting module 804 for transmitting the hardware device identifier to a handover node 102. In some embodiments, the manager node 108 may include a transmitting module 806 for transmitting contact information for the manager node 108 to the hardware device 104. In some embodiments, the contact information may include a port number of the manager node 108 that is different than a port number of the manager node 108 used to communicate with the handover node 102. In some embodiments, the manager node 108 may include a receiving module 808 for receiving a request to establish a communication session between the hardware device 104 and the manager node 102. In some embodiments, the request may have been transmitted by the hardware device 104A.

Summary of Various Embodiments

1. A method (400) performed by a handover node (102), the method comprising: receiving (s406) a first hardware device identifier transmitted by a hardware device (104A), the first hardware device identifier identifying the hardware device; receiving (s408) a second hardware device identifier transmitted by a manager node (108A), the second hardware device identifier identifying the hardware device; determining (s412) that the second hardware device identifier matches the first hardware device identifier; and, as a result of determining that the second hardware device identifier matches the first hardware device identifier, transmitting (s414) contact information for the manager node to the hardware device.

2. The method of embodiment 1, further comprising receiving (s402) a request to establish a communication session between the hardware device and the handover node, wherein the request is transmitted by hardware device.

3. The method of embodiment 2, wherein the handover node receives the first hardware device identifier and transmits the contact information using the communication session between the hardware device and the handover node.

4. The method of any one of embodiments 1-3, further comprising performing (s404) one or more checks on the hardware device.

5. The method of embodiment 4, wherein performing the one or more checks on the hardware device comprises identifying whether the hardware device is valid.

6. The method of embodiment 4 or 5, wherein performing the one or more checks on the hardware device comprises checking the physical and/or software installation of the hardware device.

7. The method of any one of embodiments 1-6, wherein the handover node, hardware device, and manager node are separate and distinct nodes.

8. The method of any one of embodiments 1-7, further comprising receiving (s410) the contact information for the manager node, the contact information being transmitted by the manager mode.

9. The method of any one of embodiments 1-8, wherein the contact information comprises an Internet Protocol (IP) address of the manager node and a port number for the hardware device to use when establishing a communication session between the hardware device and the manager node.

10. The method of any one of embodiments 1-9, further comprising transmitting commands or scripts to the hardware device, the commands or scripts causing the hardware device to perform a handover comprising establishing a communication session with the manager mode.

11. A handover node (102) adapted to: receive a first hardware device identifier transmitted by a hardware device (104A), the first hardware device identifier identifying the hardware device; receive a second hardware device identifier transmitted by a manager node (108A), the second hardware device identifier identifying the hardware device; determine whether the second hardware device identifier matches the first hardware device identifier; and, as a result of determining that the second hardware device identifier matches the first hardware device identifier, transmit contact information for the manager node to the hardware device.

12. The handover node of embodiment 11, wherein the handover node is further adapted to receive a request to establish a communication session between the hardware device and the handover node, wherein the request is transmitted by hardware device.

13. The handover node of embodiment 12, wherein the handover node is adapted to receive the first hardware device identifier and transmits the contact information using the communication session between the hardware device and the handover node.

14. The handover node of any one of embodiments 11-13, wherein the handover node is further adapted to perform one or more checks on the hardware device.

15. The handover node of embodiment 14, wherein performing the one or more checks on the hardware device comprises identifying whether the hardware device is valid.

16. The handover node of embodiment 14 or 15, wherein performing the one or more checks on the hardware device comprises checking the physical and/or software installation of the hardware device.

17. The handover node of any one of embodiments 11-16, wherein the handover node, hardware device, and manager node are separate and distinct nodes.

18. The handover node of any one of embodiments 11-17, wherein the handover node is further adapted to receive the contact information for the manager node, the contact information being transmitted by the manager mode.

19. The handover node of any one of embodiments 11-18, wherein the contact information comprises an Internet Protocol (IP) address of the manager node and a port number for the hardware device to use when establishing a communication session between the hardware device and the manager node.

20. The handover node of any one of embodiments 11-19, wherein the handover node is further adapted to transmit commands or scripts to the hardware device, the commands or scripts causing the hardware device to perform a handover comprising establishing a communication session with the manager mode.

21. A method (500), the method comprising: a manager node (108A) receiving (s502) a hardware device identifier that identifies a hardware device (104A); the manager node (108A) transmitting (s504) the hardware device identifier to a handover node (102); the manager node (108A) transmitting (s506) contact information for the manager node to the handover node, wherein the contact information includes a port number of the manager node different than a port number of the manager node used to communicate with the handover node; and the manager node (108A) receiving (s508) a request to establish a communication session between the hardware device and the manager node, the request having been transmitted by the hardware device.

22. The method of embodiment 21, wherein: transmitting the contact information comprises transmitting a network layer protocol data unit (PDU) that includes a network layer header and a transport layer PDU; the transport layer PDU includes a transport layer header and a transport layer payload; and the transport layer payload includes the contact information.

23. The method of embodiment 22, wherein the network layer header comprises an Internet Protocol (IP) address for the manager node, the transport layer header comprises the port number of the manager node used to communicate with the handover node, and the transport layer payload comprises the port number of the manager node that is different than the port number of the manager node used to communicate with the handover node.

24. The method of any one of embodiments 21-23, wherein the received hardware device identifier is transmitted by a node operated by a customer (110) managing the hardware device.

25. The method of any one of embodiments 21-24, wherein the manager node transmits the hardware device identifier and the contact information is a single message.

25a. The method of any one of embodiments 21-25, further comprising: a portal transmitting to a customer node operated by a customer managing the hardware device one or more web objects that cause the node to display a web page to the customer, wherein the web page that either enables the customer to input the hardware device identifier into the web page or select the hardware device identifier from one or more hardware device identifiers included in the web page and then cause the node to transmit the input/selected hardware device identifier to the portal; the portal receiving the hardware device identifier transmitted by the customer node; and, after receiving the hardware device identifier transmitted by the customer node, selecting the manager node and transmitting the hardware device identifier to the manager node.

25b. The method of any one of embodiments 21-25a, further comprising the manager node (108A) onboarding the hardware device (104A).

26. A manager node (108A) adapted to: receive a hardware device identifier that identifies a hardware device (104A); transmit the hardware device identifier to a handover node (102); transmit contact information for the manager node to the handover node, wherein the contact information includes a port number of the manager node different than a port number of the manager node used to communicate with the handover node; and receive a request to establish a communication session between the hardware device and the manager node, the request having been transmitted by the hardware device.

27. The manager node of embodiment 26, wherein: transmitting the contact information comprises transmitting a network layer protocol data unit (PDU) that includes a network layer header and a transport layer PDU; the transport layer PDU includes a transport layer header and a transport layer payload; and the transport layer payload includes the contact information.

28. The manager node of embodiment 27, wherein the network layer header comprises an Internet Protocol (IP) address for the manager node, the transport layer header comprises the port number of the manager node used to communicate with the handover node, and the transport layer payload comprises the port number of the manager node that is different than the port number of the manager node used to communicate with the handover node.

29. The manager node of any one of embodiments 26-28, wherein the received hardware device identifier is transmitted by a node operated by a customer (110) managing the hardware device.

30. The manager node of any one of embodiments 26-29, wherein the manager node is adapted to transmit the hardware device identifier and the contact information is a single message.

30a. The manager node of any one of embodiments 26-30, wherein the manager node is adapted to onboard the hardware device (104A).

31. A computer program comprising instructions for adapting an apparatus to perform the method of any one of embodiments 1-10 and 21-25b.

32. A carrier containing the computer program of embodiment 31, wherein the carrier is one of an electronic signal, optical signal, radio signal, or compute readable storage medium.

33. A handover node (102) comprising: a receiving module (702) for receiving a first hardware device identifier transmitted by a hardware device (104), the first hardware device identifier identifying the hardware device; a receiving module (704) for receiving a second hardware device identifier transmitted by a manager node (108a), the second hardware device identifier identifying the hardware device; a determining module (706) for determining that the second hardware device identifier matches the first hardware device identifier; and a transmitting module (708) for, as a result of determining that the second hardware device identifier matches the first hardware device identifier, transmitting contact information for the manager node to the hardware device.

34. A manager node (108) comprising: a receiving module (802) for receiving a hardware device identifier that identifies a hardware device (104); a transmitting module (804) for transmitting the hardware device identifier to a handover node (102); a transmitting module (806) for transmitting contact information for the manager node to the handover node, wherein the contact information includes a port number of the manager node different than a port number of the manager node used to communicate with the handover node; and a receiving module (808) for receiving a request to establish a communication session between the hardware device and the manager node, the request having been transmitted by the hardware device.

While various embodiments are described herein, it should be understood that they have been presented by way of example only, and not limitation. Thus, the breadth and scope of this disclosure should not be limited by any of the above-described exemplary embodiments. Moreover, any combination of the above-described elements in all possible variations thereof is encompassed by the disclosure unless otherwise indicated herein or otherwise clearly contradicted by context.

Additionally, while the processes described above and illustrated in the drawings are shown as a sequence of steps, this was done solely for the sake of illustration. Accordingly, it is contemplated that some steps may be added, some steps may be omitted, the order of the steps may be re-arranged, and some steps may be performed in parallel.

The invention claimed is:

1. A method performed by a handover node, the method comprising:

receiving a first hardware device identifier transmitted by a hardware device, the first hardware device identifier identifying the hardware device;

receiving a second hardware device identifier transmitted by a manager node, the second hardware device identifier identifying the hardware device;

determining that the second hardware device identifier matches the first hardware device identifier; and as a result of determining that the second hardware device identifier matches the first hardware device identifier, transmitting contact information for the manager node to the hardware device.

2. The method of claim 1, further comprising receiving a request to establish a communication session between the hardware device and the handover node, wherein the request is transmitted by hardware device.

3. The method of claim 2, wherein the handover node receives the first hardware device identifier and transmits the contact information using the communication session between the hardware device and the handover node.

4. The method of claim 1, further comprising performing one or more checks on the hardware device.

5. The method of claim 1, further comprising receiving the contact information for the manager node, the contact information being transmitted by the manager mode.

6. The method of claim 1, wherein the contact information comprises an Internet Protocol (IP) address of the manager node and a port number for the hardware device to use when establishing a communication session between the hardware device and the manager node.

7. The method of claim 1, further comprising transmitting commands or scripts to the hardware device, the commands or scripts causing the hardware device to perform a handover comprising establishing a communication session with the manager mode.

8. A handover node adapted to:
receive a first hardware device identifier transmitted by a hardware device, the first hardware device identifier identifying the hardware device;
receive a second hardware device identifier transmitted by a manager node, the second hardware device identifier identifying the hardware device;
determine whether the second hardware device identifier matches the first hardware device identifier; and
as a result of determining that the second hardware device identifier matches the first hardware device identifier, transmit contact information for the manager node to the hardware device.

9. The handover node of claim 8, wherein the handover node is further adapted to receive a request to establish a communication session between the hardware device and the handover node, wherein the request is transmitted by hardware device.

10. The handover node of claim 9, wherein the handover node is adapted to receive the first hardware device identifier and transmit the contact information using the communication session between the hardware device and the handover node.

11. The handover node of claim 8, wherein the handover node is further adapted to perform one or more checks on the hardware device.

12. The handover node of claim 8, wherein the handover node is further adapted to receive the contact information for the manager node, the contact information being transmitted by the manager mode.

13. The handover node of claim 8, wherein the contact information comprises an Internet Protocol (IP) address of the manager node and a port number for the hardware device to use when establishing a communication session between the hardware device and the manager node.

14. The handover node of claim 8, wherein the handover node is further adapted to transmit commands or scripts to the hardware device, the commands or scripts causing the hardware device to perform a handover comprising establishing a communication session with the manager mode.

15. A method comprising:
a manager node receiving a hardware device identifier that identifies a hardware device;
the manager node transmitting the hardware device identifier to a handover node;
the manager node transmitting contact information for the manager node to the handover node, wherein the contact information includes a port number of the manager node different than a port number of the manager node used to communicate with the handover node; and
the manager node receiving a request to establish a communication session between the hardware device and the manager node, the request having been transmitted by the hardware device.

16. The method of claim 15, wherein:
transmitting the contact information comprises transmitting a network layer protocol data unit (PDU) that includes a network layer header and a transport layer PDU;
the transport layer PDU includes a transport layer header and a transport layer payload; and
the transport layer payload includes the contact information.

17. The method of claim 16, wherein the network layer header comprises an Internet Protocol (IP) address for the manager node, the transport layer header comprises the port number of the manager node used to communicate with the handover node, and the transport layer payload comprises the port number of the manager node that is different than the port number of the manager node used to communicate with the handover node.

18. The method of claim 15, further comprising:
a portal transmitting to a customer node operated by a customer managing the hardware device one or more web objects that cause the node to display a web page to the customer, wherein the web page that either enables the customer to input the hardware device identifier into the web page or select the hardware device identifier from one or more hardware device identifiers included in the web page and then cause the node to transmit the input/selected hardware device identifier to the portal;
the portal receiving the hardware device identifier transmitted by the customer node; and
after receiving the hardware device identifier transmitted by the customer node, selecting the manager node and transmitting the hardware device identifier to the manager node.

19. The method of claim 15, further comprising the manager node onboarding the hardware device.

20. A manager node adapted to:
receive a hardware device identifier that identifies a hardware device;
transmit the hardware device identifier to a handover node;
transmit contact information for the manager node to the handover node, wherein the contact information includes a port number of the manager node different than a port number of the manager node used to communicate with the handover node; and receive a request to establish a communication session between the hardware device and the manager node, the request having been transmitted by the hardware device.

* * * * *